May 31, 1932.  H. T. MARTIN ET AL  1,861,221

REELING DEVICE

Filed Jan. 31, 1929

INVENTORS: H. T. MARTIN
F. A. HOYT

BY

*Walter C. Kiesel*
ATTORNEY

Patented May 31, 1932

1,861,221

UNITED STATES PATENT OFFICE

HAROLD T. MARTIN, OF EAST ORANGE, AND FREDERICK A. HOYT, OF BLOOMFIELD, NEW JERSEY, ASSIGNORS TO BELL TELEPHONE LABORATORIES, INCORPORATED, OF NEW YORK, N. Y., A CORPORATION OF NEW YORK

REELING DEVICE

Application filed January 31, 1929. Serial No. 336,449.

This invention relates to reeling devices, and more particularly to reels for cords attached to telephones.

An object of the invention is to automatically control the limit of travel of the slack portion of the conductor cord extending from a telephone set.

In the usual take-up device heretofore used in connection with electrical conductors, such as cord reels, the tension spring is controlled by the limit of the length of conductor and a clutch mechanism for arresting the motion of the reel. This arrangement has certain disadvantages since a strain is placed on the connections of the conductor when the full length of the cord is unwound from the reel, and the length of cord extending from the reel when fully wound thereon, is variable. When the cord is attached to a desk telephone or handset, it is desirable to have a definite short length of cord extending from the reel when the telephone or handset is not in use. Furthermore, this short length of cord must not be subjected to tension as would occur in the ordinary reel in which the weight of the telephone set exerts a tension on the cord extending from the reel.

In accordance with this invention the reeling device comprises a casing which encloses a metallic sheave or reel associated with a tensioned spring and gear attached to a shaft extending through the casing. A spiral groove formed on the gear cooperates with a sliding pawl carried by the casing to limit the number of rotations of the reel. This arrangement provides a control means for winding or unwinding a cord on the reel and permits the reel to make a definite number of revolutions before its rotation is arrested. A stopping mechanism comprising a notched disc carried by the casing cooperates with a rotatable disc carrying a pair of pivoted pawls to stop the reel at various positions, to relieve the tension on the cord conductor. The stopping mechanism may be readily disengaged to extend the cord further or rewind the cord on the reel.

The invention may be more clearly understood from the following detailed description in connection with the accompanying drawings, in which.

Figure 1:
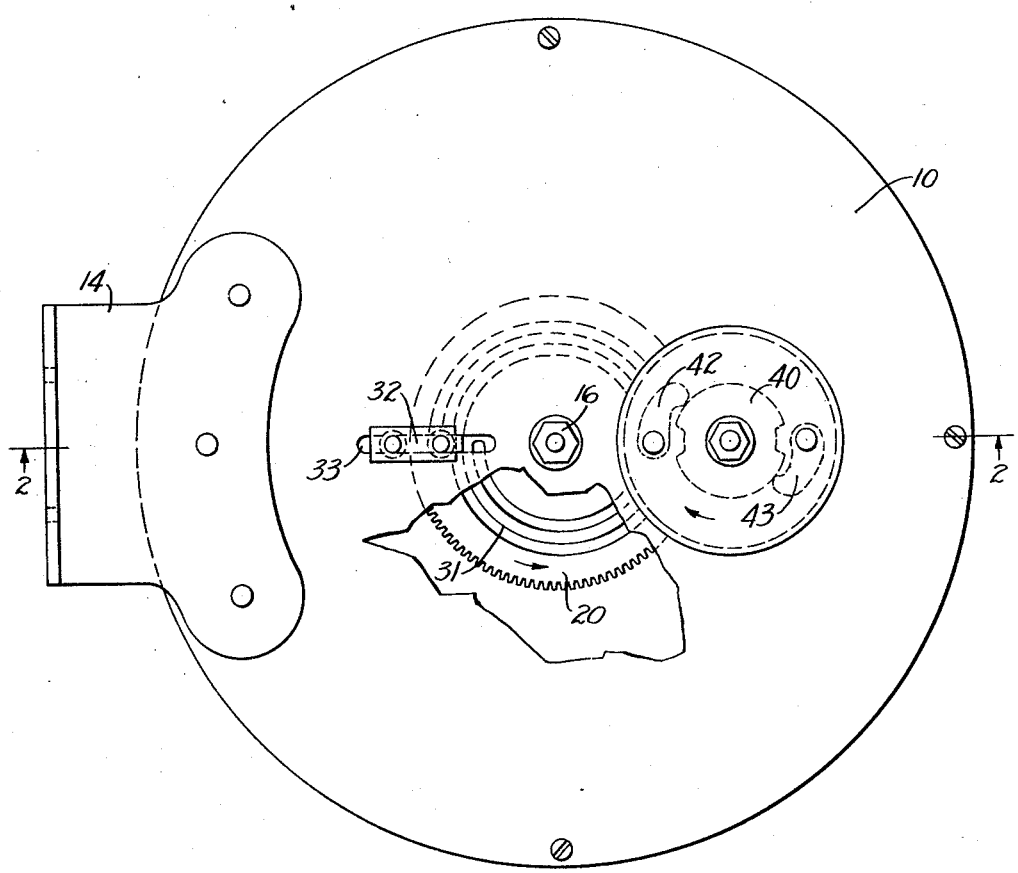
Fig. 1 is a rear view of the reeling device made in accordance with this invention with certain of the elements shown in outline and a portion of the casing broken away to show the spiral groove in the rotating gear.
Figure 2:
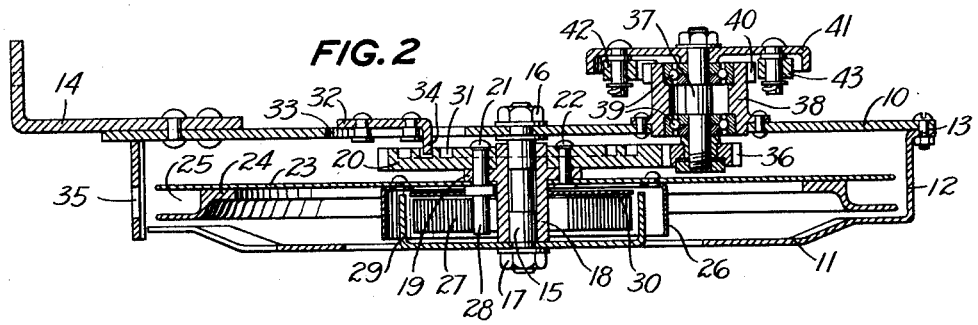
Fig. 2 is a cross-sectional view of the reeling device on the line 2—2 of Fig. 1.

Referring to the drawings of Figs. 1 and 2, the cord reeling device comprises an enclosing casing of metal formed of a rear circular plate or member 10 and a dish-shaped portion 11 having a cylindrical wall 12 terminating in a flanged portion 13 which is attached to the rear plate 10 by screws and nuts. An angular metallic supporting member 14 is riveted to the rear plate to attach the reeling device to a stationary support. A shaft 15 extends axially through the casing and is rigidly fastened to the rear plate 10 by nut 16 and to the dish-shaped portion by the nut 17. A cylindrical sleeve or bearing 18 having a circular flange formed thereon intermediate the ends thereof surrounds the shaft 15 and is freely movable with respect to the shaft. A large gear-wheel 20 is rigidly fastened to the bearing flange 19 by the rivets 21 and 22 and is located adjacent the rear circular plate 10.

The reel member or sheave comprises a circular disc 23 and a flanged annular ring 24, which is attached to the disc 23 near its edge to form a groove 25 to receive the conductor to be wound thereon. The sheave is rigidly attached to the circular flange 19 by the rivets 21 and 22 and oppositely positioned on the flange 19 with respect to the gear-wheel 20. A cup member 26 is carried by the plate 23 of the sheave and is coaxial with the shaft 15 within the casing. This cup forms a partial enclosure for the tension spring 27 which encircles the shaft and is attached at one end to the extension 28 on the rivet 21 and at the other end to the bent-in portion 29 of the casing wall 11. A disc 30 is located between the edge-wound tension spring 27 and the surface of the sheave 23 to prevent displacement of the tension spring. This assembly forms a compact arrangement of the elements of the reeling device and materially reduces the thickness of the reel so that very little space is required for the device when mounted in a cabinet.

In order to control the tension of spring 27, the gear-wheel 20 is provided with a spiral groove or track 31 on the surface adjacent the rear wall plate 10. A sliding pawl 32 riding in an elongated slot 33 in the rear plate 10 is provided with an angular extension 34 which fits into the spiral groove in the gear-wheel 20. This arrangement controls the rotation of the sheave or reel for a definite number of revolutions, depending on the number of turns of cord carried on the sheave. As shown in Fig. 1, the spiral track in the gear-wheel 20 is intended to represent two complete revolutions due to the reel being of large diameter and the required length of cord (not shown) can be accommodated on the large diameter sheave. However, the groove in the gear-wheel 20 may be of any desired number of revolutions depending on the length of cord wound on the reel and the diameter of the reel. It is apparent that the spirally grooved member may be made integral with the sheave. It will be seen that due to the sliding pawl 32 engaging the limits of the spiral track in the gear-wheel it will be impossible to rotate the reel more than two complete revolutions to either wind the cord or unwind the cord on the reel. In this way the strain on the terminal connections of the cord will be relieved and since the rewinding will relieve the tension on the section of the cord extending from the reel through the slot 35 in the cylindrical wall 12, no undue strain will be placed on the wound cord.

It is also convenient to maintain a definite length of cord unwound from the reel when a telephone set is being used and at the same time it is desirable that no undue strain be placed on the length of cord unwound from the reel. This is accomplished in accordance with this invention by providing a stopping mechanism for arresting the length of cord unwound from the reel and holding the sheave in a stationary position until it is desired to rewind the cord on the sheave. This stopping mechanism comprises a pinion gear 36, which engages the large gear-wheel 20 within the casing and is rigidly attached to a shaft 37 rotatably mounted in a hub member 38 by means of ball bearings 39. The hub 38 carries a notched disc 40 which is maintained stationary on the end of the hub. A dished plate 41 attached to the rotating shaft 37 carries a pair of pawls 42 and 43, which engage the notched disc 40 and hold the sheave in any desired position. In the ordinary type of reeling device the rotation of the sheave is dependent on the tension of the spring, which places undue strain on an electrical conductor cord. In the present invention this spring is controlled so that the cord is relieved of all strain. Assuming a cord (not shown) is wound on the sheave in the grooved portion 25 and the free end extends through the opening 35 in the casing. When the cord is pulled from the reel, the sheave and gear 20 rotate in a counter-clockwise direction thereby causing the finger 34 on the sliding pawl 32 to travel in the groove 31 in the gear member. When the finger reaches the outer end of the spiral groove, the motion of the sheave is arrested without placing any substantial strain on the cord conductor. While the gear 20 is rotating, the pinion 36 attached to shaft 37 is rotating in a clockwise direction and since the disc 41 is rigidly attached to the shaft 37, the pawls 42 and 43 travel around the stationary notched disc 40. As soon as the pull on the conductor cord is relieved, the motion of the gear 20 and the disc 41 is reversed until the pawls drop into the notches in the disc 40. When it is desired to rewind the cord on the reel, a slight pull will disengage the pawls from the notched disc and the rapid rotation of the sheave prevents the pawls engaging the notched disc until the cord is completely wound on the sheave at which time the sliding pawl has reached the inner end of the groove 31 and the motion of the sheave is arrested. This operation leaves a definite short length of cord extending from the reel to which the telephone instrument is connected. When it is desired to unwind only half the cord from the reel, or any other desired length, the slight reversal of the rotating elements causes the pawls to lock the sheave in a temporary arrested position, until disengaged to rewind the cord on the sheave or unwind a longer length from the reel.

While the invention has been disclosed in a particular assembly of elements, it is apparent that various modifications may be made, or the invention applied to other assembled structures, without departing from the spirit of the invention as defined in the appended claims.

What is claimed is:

1. A reeling device comprising a casing, a rotatable reel within said casing, a tension spring for said reel, cooperating means on said casing and reel for limiting the tension of said spring, and means on said casing for arresting the rotation of said reel in one direction, said arresting means being in engagement with one of said cooperating means.

2. A reel comprising a casing having a radial slot, a rotatable sheave in said casing, a spirally grooved member attached to said sheave and movable therewith, and a sliding pawl on said casing movable in said slot and engaging said grooved member to limit the rotation of said sheave.

3. A reel comprising a casing, a rotatable sheave in said casing, a tension spring attached to said casing and sheave, a grooved member attached to said sheave, and a radially movable member exterior to said casing having an inwardly projecting finger slidably movable in said casing engaging said grooved member.

4. A reel comprising a casing, a rotatable sheave in said casing, a tension spring attached to said casing and sheave, a grooved member attached to said sheave, a sliding member extending through said casing and engaging said grooved member, and separate means on said casing engaging said grooved member to stop the rotation of said sheave at definite positions.

5. A reel comprising a casing, a rotatable sheave in said casing, a tension spring attached to said casing and sheave, a spirally grooved gear rigidly attached to said sheave, and a slidable member extending through said casing engaging said grooved gear to limit the rotation of said sheave.

6. A reel comprising a casing, a rotatable sheave in said casing, a tension spring attached to said casing and reel, a spirally grooved gear on said sheave, a slidable member extending through said casing and engaging said grooved gear to limit the rotation of said sheave, a pinion gear extending through to said casing and engaging the periphery of said gear, a notched stationary disc exterior to said casing, and a rotating pawl member attached to said pinion gear and engaging said notched disc.

In witness whereof, we hereunto subscribe our names this 30th day of January, 1929.

HAROLD T. MARTIN.
FREDERICK A. HOYT.